March 16, 1926.
F. T. GAUSE
TIRE CHAIN
Filed May 26, 1923
1,577,014
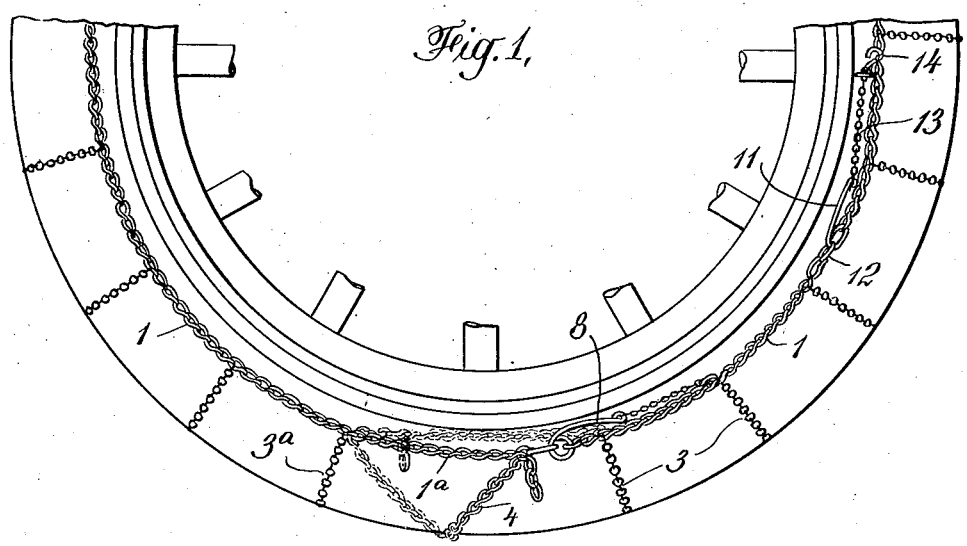
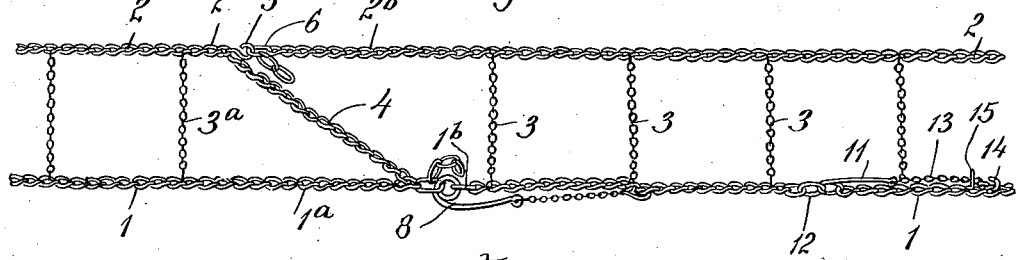
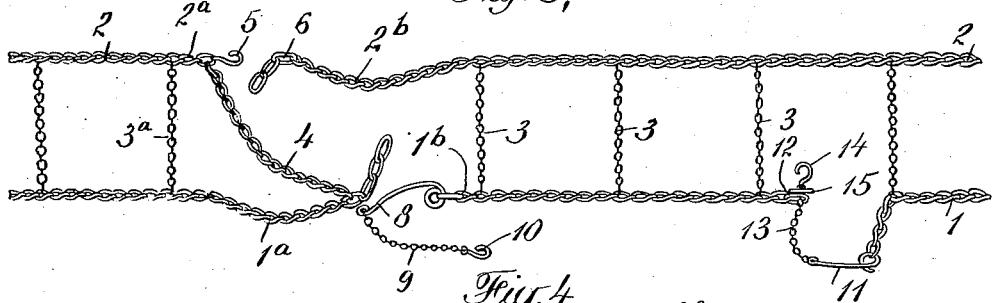
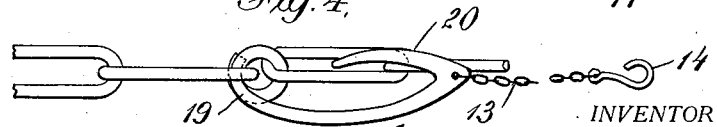
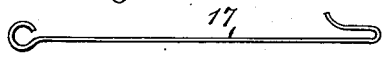
INVENTOR
Frederick Taylor Gause
BY
Pennie, Davis, Marvin & Edmonds
his ATTORNEYS Patented Mar. 16, 1926.

1,577,014

UNITED STATES PATENT OFFICE.

FREDERICK TAYLOR GAUSE, OF WILMINGTON, DELAWARE.

TIRE CHAIN.

Application filed May 26, 1923. Serial No. 641,574.

*To all whom it may concern:*

Be it known that I, FREDERICK TAYLOR GAUSE, a citizen of the United States, residing at Wilmington, in the county of New Castle, State of Delaware, have invented certain new and useful Improvements in Tire Chains; and I do hereby declare the following to be a full, clear, and exact description of the invention, such as will enable others skilled in the art to which it appertains to make and use the same.

This invention relates to tire chains used in connection with automobiles or other pneumatic tired vehicles to prevent skidding of the vehicle on slippery pavements and also to increase the tractive grip of the tires in mud, snow, etc. Tire chains as now commonly constructed comprise a pair of side chains with hooks or fastenings on their ends, and a series of cross chains connecting the two chains at intervals of five or six inches. The side chains are of a length such that when their ends are put together they form lengths of slightly greater circumference than the wheel rim and lie symmetrically on opposite sides of the tire.

When the chains are applied to the tire, the side chains are usually drawn fairly taut so as to hold the cross chains snugly against the circumference of the tire, it having been found that even when the chains are drawn fairly taut the chains will "creep" on the tire and thereby prevent wear of the tire in one place, as would be the case were the chains actually anchored against movement around the wheel, as for instance, by attachment to the spokes. By drawing the chains tight on the tire the noise of the chains is greatly reduced and the tractive grip improved, but with the ordinary style of chain it is a tedious and dirty job to apply the chains to the wheels at all, and it is a particularly difficult thing to get the chains drawn tight, as the fasteners are in an awkward position to reach and the hooks are difficult to fasten while holding the chains tight.

In my Patent No. 1,434,111 granted October 31, 1922, I have disclosed an improved chain construction whereby the application of the chains to the wheels is greatly facilitated, and the invention of this application is specifically an improvement on the chain described and claimed in my said patent.

The principal feature of my patented tire chain is the employment of a diagonal cross chain adjacent the point in the side chain where the fasteners are located, whereby the chain may be applied to the tire and drawn tight without moving the vehicle, that is, without first laying the chain out on the ground and rolling the vehicle over it, as is the common and necessary practice in putting on chains of ordinary construction. In the tire chain of the present application I employ a diagonal cross chain of the same general arrangement as described in my said patent, but I have improved upon the chain in other respects, particularly in the fastening devices and in the side chain construction, whereby the construction is simplified and the operation of applying the chain to the wheel is made easier.

I have illustrated a preferred embodiment of my invention in the accompanying drawings, in which—

Figure 1 is an elevational view of a portion of a vehicle wheel provided with my improved chain, the view showing the outside of the wheel;

Fig. 2 is a view showing the chain spread out and with all the fasteners connected as they are when the chain is applied to the wheel;

Fig. 3 is a view showing the end portions of the chain with the fastenings disconnected and the chain adjusted and ready for application to the wheel;

Fig. 4 is a detail view on a larger scale showing a modification of the side chain connection; and Fig. 5 is a detail view showing a hook which may be used with advantage in applying the chain to the wheel.

Referring to the drawings, particularly to Figs. 1, 2 and 3, 1 and 2 indicate respectively the two side chains and 3 the cross chains connecting the two side chains in the usual manner. The side chains 1 and 2 do not terminate at the same point with relation to the cross chains as in the ordinary chain construction, but instead chain 1 has its end 1ª extending considerably beyond the adjacent cross chain 3ª, while the corresponding end of the inner side chain 2 terminates immediately beyond the point of attachment of the cross chain 3ª, as shown more clearly in Fig. 2.

The other ends of the chains are also of unequal length, the end 2ᵇ extending beyond the point of attachment of the cross chain, while the end 1<sup>b</sup> is short. A diagonal cross chain 4 is provided connecting the extensions 1ᵃ and 2ᵃ near their ends. The mid point of this chain, that is, the point of contact with the road where it crosses the crown of the tire, is substantially midway between the two end cross chains and spaced from the cross chains about the same distance as the cross chains are spaced from each other. The purpose of this diagonal cross chain is to permit the side chains to be drawn taut without having to roll the car over the chain, and without leaving a gap of unusual length between the points where the cross chains cross the crown of the tire, all as fully explained in my patent above referred to.

For fastening the ends of the inner side chain 2 together any ordinary fastening may be employed, for instance, a simple hook 5 and ring 6. For fastening the ends of the outer chain 1 together I preferably employ a fastener 8 of the same kind as disclosed in my patent, the fastener comprising a lever arm for drawing the two ends of the chain together with a loop at the end which, when the fastener is in its closed position, lies between the ends of the chain and forms in effect a connecting link between them. The free end of the lever arm of the fastener is provided with a light chain 9 terminating in a hook 10 which is engaged with an adjacent link of the side chain when the fastener is closed to hold the fastener against accidental opening.

In my improved chain forming the invention of this application, the outer side chain 1 is provided at a point near one end of the chain with a device whereby the length of the chain may be extended during the application of the chain to the tire. As shown in Figs. 1, 2 and 3, this device comprises preferably a lever hook 11 attached to the final link in the main length of the chain. Attached to the end of the lever arm is a short chain 13 having a small hook 14 in the end. The adjacent end of the short length of the side chain is provided with a flat link 12 of a size to permit the chain 13 to work freely through it. The hook 14 is also preferably provided with a washer 15 of a size to prevent the end chain being drawn through the flat link 12 unless the washer is manipulated to force it through the link.

When the chain is to be applied to the wheel the hook 11 is released and drawn through the link 12 until the washer 15 engages the link, thereby lengthening the outside chain 1 as shown more particularly in Fig. 3. The chain is then placed over the tire in a position such that the ends of the chain will meet at the bottom of the wheel when the fasteners are connected. The hook 5 of the inner chain is then hooked into ring or link 6 at or adjacent the end of the extension 2<sup>b</sup>. In doing this the hook 17 shown in Fig. 5 may be used to pick up the end 2<sup>b</sup> of the chain instead of reaching under the wheel and picking up the chain by hand. The slack in the outer chain allowed by releasing the hook 11 allows the inner chain to be drawn well to the rear and gives sufficient slack in the inner chain for the fastening of the ends to be readily accomplished without reaching through the spokes of the wheel or getting down on the ground. Were it not for the slack in the outer chain the end 2<sup>b</sup> of the inner chain could not be drawn back to any great extent without pulling the end of the outer chain under the wheel to an inaccessible position. The slack, however, in the outer chain, allows the inner chain to be readily fastened without drawing the free end of the outer chain out of reach. That is, the slack portion of the outer chain can be drawn around the tire, leaving plenty of slack in the inner chain for the fastening of the inner chain to be readily effected.

After the ends of the inner chain are hooked together, the hook 11 is drawn into the link 12, thereby taking up the slack in the chain. The ends of the outer chain will then be drawn together by the fastener 8. A number of flat links or rings are provided at the ends of the chains 1ᵃ and 2<sup>b</sup> whereby the length of the side chains may be altered to adjust for wear and variations in the size of the tire. If desired, the fastener 8 may be closed first and the hook 11, which is well up on the tire where it may be readily reached, used for drawing the chain snugly against the tire.

The length of chain required to build up my improved chain is no greater than for an ordinary tire chain except a slight difference in length between the diagonal cross chain and the ordinary cross chains. The only additional cost of my improved chain is the slightly greater cost of the fasteners 8 and 11 over the hooks usually employed, and this cost is negligible. In fact, if desired, one of these fasteners may be dispensed with an ordinary hook substituted as the lever fastener is necessary only for drawing the chain taut.

In Fig. 4 I have shown a modified fastener which may be used in lieu of the hook 11 for allowing slack in the chain. This fastener consists of a loop 19 similar to the loop of fastener 8 into which both the links of the meeting ends of the chain will be drawn when the chain is shortened. The other end of the fastener is provided with an extra arm 20 forming a hook for holding the short section of side chain when the length of chain is extended. That is, the hook formed by the arm 20, serves the purpose of the button or washer on the end of the small chain attached to the hook 14. The shank of the fastener 19 will be long enough to give the desired extension to the chain. This construction has the advantage of giving a better leverage for drawing the chain taut than when a part of the extra length is supplied by the small fastening chain.

It will of course be understood that other modifications may be made in the details of the construction.

I claim:

1. In a tire chain, the combination of a pair of side chains with connecting cross chains, means for attaching the ends of the side chains together, and means located at a point between the ends of the chain and independent of said attaching means for lengthening one side chain while the chain is being applied and for taking up the slack of the chain after it is on the wheel.

2. In a tire chain, the combination of a pair of side chains, cross chains connecting the side chains, the last of said cross chains adjacent the ends of said side chains lying at an angle to said side chains and other cross chains, fasteners for connecting the ends of the side chains together, and means located at a point between the ends of the chain for lengthening one of said side chains when the chain is applied to the tire and for shortening said chain after the chain is in place.

3. In a tire chain, the combination of a pair of side chains with connecting cross chains, means for attaching the ends of the side chains together, one of said side chains containing a portion of extra length between its ends, and means for taking up the extra length, one of said fastening means comprising a lever for drawing said chain taut as it is fastened.

4. In a tire chain, the combination of a pair of side chains, cross chains connecting said side chains at intervals in their length, each of said side chains having means for fastening its two ends together, said fastening means being at different points in the side chains with respect to the points of attachment of the cross chains, and a diagonal cross chain extending from one side chain adjacent one end thereof, to a point on the other side chain adjacent its end, one of said chains having means located at a different point on said diagonal chain for lengthening said chain while it is being applied to the tire.

In testimony whereof I affix my signature.

FREDERICK TAYLOR GAUSE.